Oct. 9, 1962 J. H. MacNEILL 3,057,214

DRIVE MECHANISM FOR A TAPE TRANSPORT

Filed May 17, 1960 2 Sheets-Sheet 1

INVENTOR.
JOHN H. MACNEILL

BY Hurwitz & Rose

ATTORNEYS

Oct. 9, 1962 J. H. MacNEILL 3,057,214

DRIVE MECHANISM FOR A TAPE TRANSPORT

Filed May 17, 1960 2 Sheets-Sheet 2

INVENTOR.
JOHN H. MACNEILL

BY Hurvitz + Rose

ATTORNEYS

United States Patent Office 3,057,214

Patented Oct. 9, 1962

3,057,214

DRIVE MECHANISM FOR A TAPE TRANSPORT

John H. MacNeill, Melbourne, Fla., assignor to Soroban Engineering, Inc., Melbourne, Fla., a corporation of Florida Filed May 17, 1960, Ser. No. 29,601
21 Claims. (Cl. 74—125.5)

Figures 1, 2A, 2B, 2C, 2D:
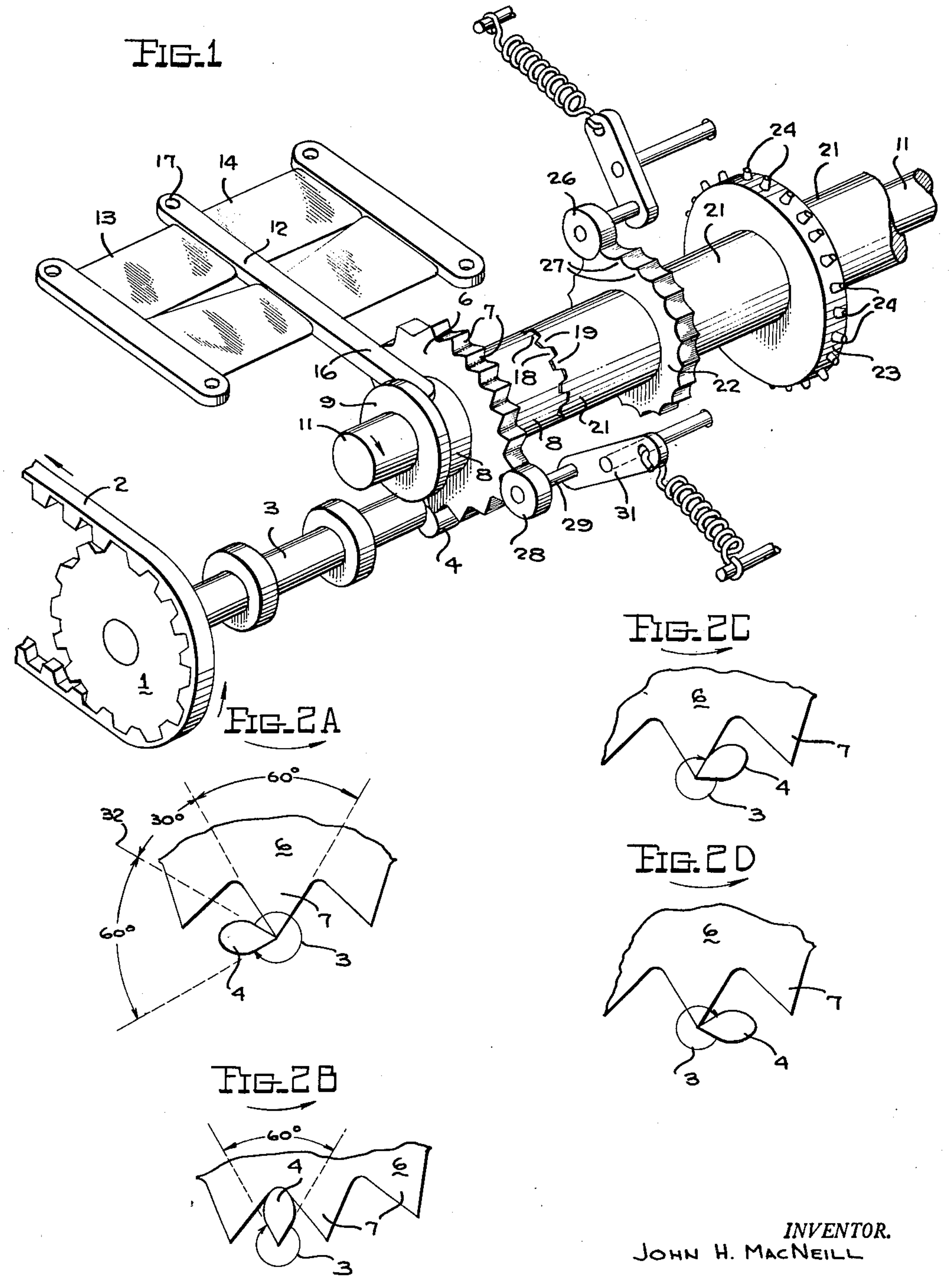

The present invention relates to tape transport mechanisms and more particularly to a tape transport mechanism for intermittently and cyclically advancing a length of flexible tape such as punched paper tape.

It is an object of the present invention to provide a simple and reliable mechanism for selectively and intermittently advancing a length of elongated flexible tape.

It is another object of the present invention to provide a mechanism for selectively advancing a punched paper tape which mechanism may be employed both at relatively low and relatively high rates of operation and may be employed to advance the tape line-by-line or a predetermined number of lines during each feed cycle.

It is yet another object of the present invention to provide a mechanism for advancing lengths of a thin flexible recording medium which mechanism is extremely reliable and in which wear is reduced to a minimum.

It is still another object of the present invention to provide a tape transport mechanism having a large stationary interval during each transport cycle so as to permit, during the stationary interval, the performance of a variety of functions relating to tape transport, tape reading and/or tape recording.

In accordance with the present invention, a punched paper tape or other thin flexible recording medium is transported by a sprocket or friction roller mounted on a driven shaft which may be selectively rotated through a predetermined angle at predetermined time intervals. A drive shaft is provided which is axially aligned with the driven shaft and the adjacent ends of the two shafts are provided with substantially identical teeth which may be brought into meshing engagement with one another. The drive shaft is also provided with a gear wheel having a plurality of teeth disposed about its circumferential periphery. The gear wheel is rotated at regular cyclic intervals through a predetermined angle by means of one or more gear teeth secured to a power shaft having an axis parallel to the axes of the other two shafts. In a specific example, a single gear tooth is disposed on the end of the power shaft and is adapted to engage the teeth on the gear wheel once during each cycle of rotation so as to impart rotation thereto. The drive shaft is axially reciprocatable with respect to the driven shaft so that its teeth may be caused selectively to engage or disengage the teeth on the driven shaft. Obviously, if the gear wheel is rotated during an interval when the teeth on the drive shaft are not in engagement with the teeth on the driven shaft, the sprocket is not rotated whereas, if the teeth are in engagement during this interval, the drive sprocket is rotated. Detents are provided on both the drive and driven shafts so that when the two shafts are at rest, the teeth on the ends thereof are axially aligned in meshing relationship. Consequently during the stationary interval, the teeth on the drive shaft may be reciprocated into or out of engagement with the teeth on the driven shaft without producing substantial rubbing contact therebetween, thereby minimizing wear of these teeth. The drive shaft is axially reciprocated by means of a pair of electromagnets such that upon energization of one or the other of the electromagnets, the drive shaft is reciprocated into or out of meshing engagement with the first shaft.

The single gear tooth terminates approximately at the center or axis of the power shaft and the axis of this latter shaft intersects a circumference defined by the outer edges of the gear teeth of the drive shaft. By an appropriate selection of the angles and curvature of the gear teeth on the gear wheel and of the single gear tooth, a rolling contact may be maintained between these teeth during all intervals of engagement, and wear of the teeth is minimized. Specifically, in order to provide a gear arrangement having no sliding movement between gear teeth, the single gear tooth has a generally tear-drop shape and the gear teeth have generally negative tear-drop shapes.

The angle through which the second shaft is rotated during each feed cycle is a function of the angle of the gear teeth and of the single gear tooth; these angles being determined in any given system by requirements of the specific application. For purposes of illustration only, these angles are illustrated in the accompanying drawings as being 60°. In consequence of the selection of this specific angle, rotation is imparted to the second shaft during only one-third of each cycle of rotation of the third shaft. The remaining two-thirds of each cycle may be employed for shifting the second shaft into or out of engagement with the first shaft and may be employed for performing a variety of other functions relating to tape transport and/or tape processing. Other tooth and teeth angles may be employed to provide other ratios of drive to quiescent intervals as set forth above.

Where a tear-drop shape is employed so that rolling contact is maintained between the gear teeth, the gear wheel is driven only through somewhat more than 50 percent of its required angle of movement. If the mechanism is operated at a relatively low speed, wherein the momentum of the apparatus is insufficient to overcome the friction forces of the rotating mechanism, and nothing further were provided, the shafts would not rotate through the complete required angle and damage would result. However, since the shafts have been moved through more than half of their required angles of movement, the detenting mechanisms may be employed to provide the additional force required to rotate the shafts through the remainder of their required angular movement. On the other hand, if the apparatus is operated at such a speed that its momentum is sufficient to overcome the friction forces of the apparatus, there could be danger, if the rate of operation is sufficiently great, that the detenting force cannot prevent overshoot of the apparatus. However, with the gear teeth and single gear tooth arrangement employed as described above, the momentum of the rotating mechanism maintains the leading edge of a tooth on the gear wheel in engagement with the trailing edge of the single gear tooth and, in consequence, the single gear tooth decelerates the rotating mechanism and prevents overshoot.

In the embodiment of the invention described above, a single generally teardrop-shaped gear tooth is provided on the third shaft but it is not intended to limit the invention to this specific arrangement. For instance, in a second embodiment of the invention, two diametrically opposed, generally teardrop-shaped gear teeth are employed so as to double the rate of feed over that provided by the embodiment utilizing a single gear tooth. Other numbers and gear teeth may be employed, such as 3 or 4, depending upon the configuration of the teeth on the gear wheel.

In the embodiments of the invention discussed above, the tape or flexible recording medium is advanced one line at a time. For instance, if the tape is a punched paper tape having the codes recorded in lines transverse to the direction of movement thereof, the mechanisms described above advance the tape one line for each feed cycle so that each line is sequentially and successively presented to a reading or punching mechanism. In accordance with another embodiment of the invention, the tape may be advanced in blocks. More particularly, the apparatus may be employed with a reading or punching mechanism which reads or punches a large number of lines concurrently. In such an embodiment, the single or multiple gear teeth on the third shaft as set forth above drives a gear wheel which is coupled to the clutching mechanism through a step-up gear arrangement. The gear wheel, which is driven by the gears on the third shaft, is mounted on a shaft which has a large diameter gear wheel disposed thereon. This large diameter gear engages a small diameter gear which is selectively coupled to the tape feed sprocket or rollers. Thus, the angular rotation of the gear wheel is multiplied in accordance with the gear ratio employed; and large segments of the tape are advanced for each feed cycle. The coupling and decoupling mechanism is the same in this embodiment of the invention as in the prior embodiments of the invention.

The present invention is described as being employed as a drive mechanism having well-defined, intermittent intervals of rotation of a driven element. This description of operation is equally applicable to other types of drive mechanisms; such as, escapements and therefore, the present invention is not limited to a specific field of application and may be employed in various areas of the field of intermittent motion transmitting mechanisms.

It is another object of the present invention to provide a tape transport mechanism in which two axially aligned shafts are selectively coupled and decoupled from one another by shifting one of the shafts axially with respect to the other.

It is yet another object of the present invention to provide a tape transport mechanism in which a shaft, that is selectively shiftable into and out of engagement with a further shaft carrying a tape engaging wheel, is provided with a gear wheel driven by a single, generally teardrop-shaped gear tooth or gear teeth wherein the arrangement of the teeth on the gear wheel and the single gear tooth or gear teeth are such that rolling contact is maintained between the teeth in order to minimize wear.

It is still another object of the present invention to provide a pair of axially aligned shafts having meshing teeth formed on juxtaposed transverse edges thereof and in which detent mechanisms are provided for both of the shafts so that, when the shafts are at rest, the gear teeth are maintained in meshing relationship with respect to one another.

Another object of the present invention is to provide a tape transport mechanism in which, when the apparatus is operated at low speeds, detent mechanisms insure rotation of the mechanism through a complete cycle and in which, when the mechanism is operated at high speeds, overshoot of the rotatable apparatus is prevented by engagement between the teeth on a driven gear and a single tooth or teeth employed as a driving gear.

It is still another object of the present invention to provide a tape transport mechanism in which large blocks of a flexible recording medium may be advanced during each feed cycle.

Yet another object of the present invention is to provide an intermittent, rotary motion transmitting mechanism having well defined quiescent and active intervals which mechanism may be operated over a large range of speeds and may be employed in a variety of areas of motion transmission.

Figures 3, 4:
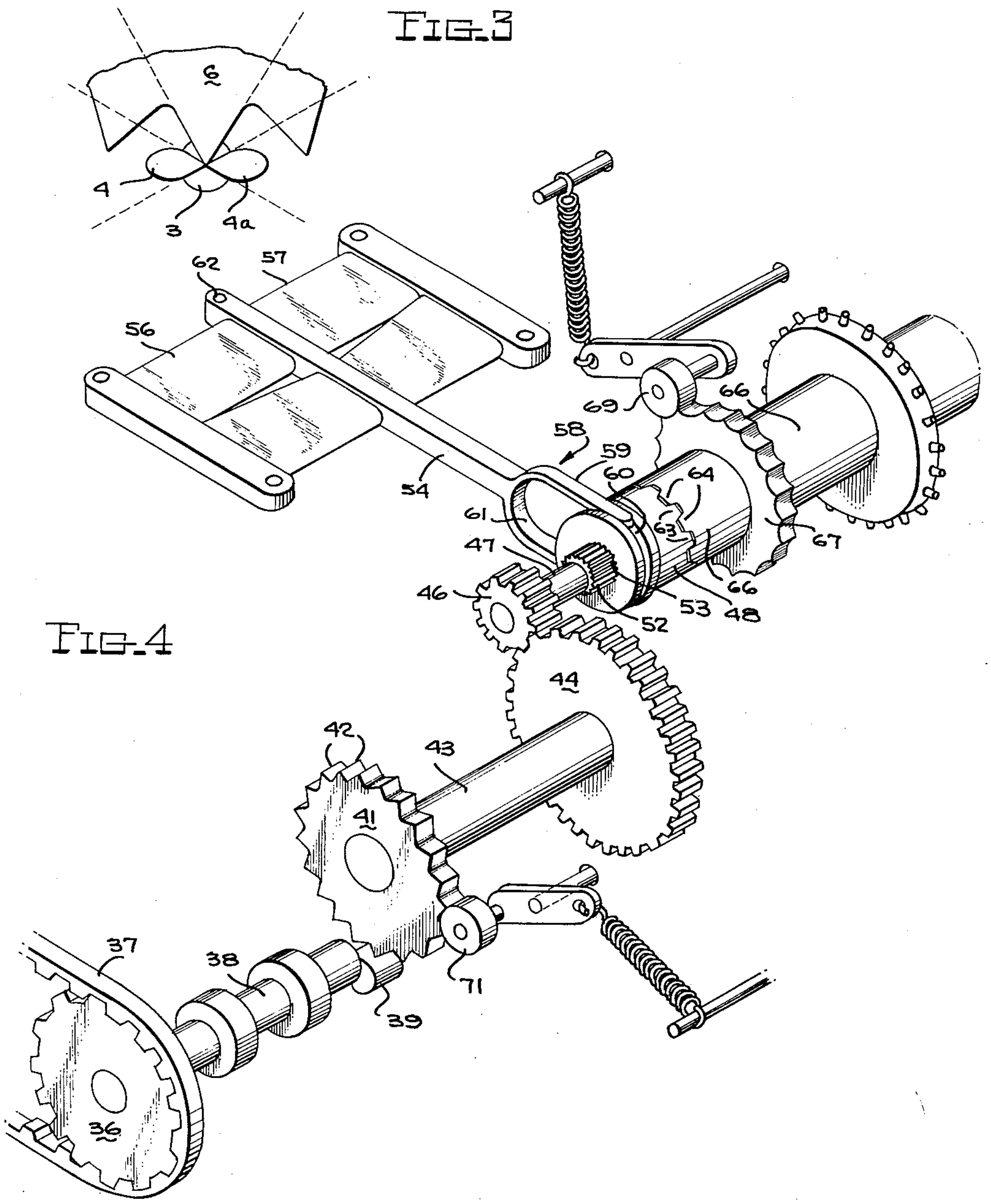

The above and still further objects, features and advantages of the present invention will become apparent upon consideration of the following detailed description of specific embodiments thereof, especially when taken in conjunction with the accompanying drawings, wherein:

FIGURE 1 of the accompanying drawings is a perspective view of apparatus of the present invention;

FIGURES 2*a* through 2*d* each illustrates a position of the gear tooth relative to the teeth of the driven gear during different intervals of the cycle of operation;

FIGURE 3 illustrates a driving mechanism employing two generally teardrop-shaped teeth in the driving mechanism; and FIGURE 4 is a perspective view of an embodiment of the present invention employed to advance large sections or blocks of a flexible recording medium during each feeding cycle of the apparatus.

Referring now specifically to FIGURE 1 of the accompanying drawings, a toothed gear 1 is driven by a toothed belt 2 for imparting a continuous counterclockwise rotation, at a desired speed, to a shaft 3 on which the toothed gear 1 is mounted. Located on the rear of the shaft 3, as illustrated in FIGURE 1, is a driving member or tooth 4 having a generally teardrop shape, as illustrated more particularly in FIGURE 2 of the accompanying drawings. The tooth 4 terminates at the center of the shaft 3 and the angle between the sides of the gear which terminate at the center of the shaft 3, form, in an illustrated embodiment of the invention only, an angle of 60° therebetween. As will become apparent subsequently, the angle between the sides of the gear 4 is determined by the inactive period of the drive mechanism desired in a specific application of the apparatus. The tooth 4 is in driving relation with a driven member or gear wheel 6 having a plurality of teeth 7 formed about the periphery thereof. The sides of the gear 7 at their outer extensions form, in the illustrative embodiment of the invention under consideration, an angle of 60° with respect to one another and the intersection between the sides of the adjacent gears which intersect adjacent the roots of the teeth, have a shape corresponding to the periphery of the tooth 4 adjacent its outer end, this being clearly illustrated in FIGURE 2B.

The gear wheel 6 is secured to a hollow cylindrical shaft 8 which terminates at its forward end, as illustrated in FIGURE 1, in an outwardly extending flange 9 forward of the gear 6. The shaft 8 is positioned on a shaft 11 for rotation with respect thereto and further for longitudinal sliding movement with respect to the central axis of the shaft. Sliding movement of the shaft 8 is under control of an armature 12 of a pair of electromagnets 13 and 14, the armature terminating in a finger 16 disposed between the gear 6 and the flange 9 and engaging the upper surface of the shaft 8, as illustrated in FIGURE 1. Energization of the magnet 13 causes ihe armature 12 to pivot about a shaft 17 disposed to the left, as viewed in FIGURE 1, of the electromagnets 13 and 14 and produces clockwise rotation of the finger 16, the pivot 17 causing it to engage the flange 9 so as to move the shaft 8 and the associated gear 6 forwardly, as illustrated in FIGURE 1. Energization of the magnet 14 effects counterclockwise rotation of the armature 12 about the shaft 17 and causes the finger 16 to engage the front wall of the gear 6 so as to move the shaft 8 and the gear rearwardly, as illustrated in FIGURE 1.

The shaft 8 terminates at its rearward end in a plurality of teeth 18 which are adapted to mesh with a second plurality of teeth 19 formed on the transverse end of a hollow cylindrical shaft 21. The shaft 21 also is rotatably supported on the shaft 11 but is prevented from sliding with respect to the longitudinal axis thereof, and has secured thereto a detent wheel 22 and a drive sprocket 23 suitably spaced from one another along the longitudinal axis of the shaft. The sprocket 23 may be any type of record driving member but FIGURE 1 is illustrated as adapted to drive a punched paper tape having a plurality of drive holes formed therein. In consequence, the sprocket 23 is provided about its circumference with a plurality of pins 24 each of which is adapted to enter a different hole on the tape member in order to impart motion thereto upon rotation of the sprocket.

The shaft 21 and sprocket 24 are detented by a spring biased roller 26 that engages a fluted circumferential surface of the detent wheel 22. Specifically, the wheel 22 is provided on its circumferential surface with a plurality of flutes 27, the number of which is equal to the number of teeth 19 formed on the end of the shaft 21 or an even multiple thereof. The gear 6 is also provided with a detent roller 28 which is spring biased into engagement with the teeth 7 and the number of teeth 7 is equal to the number of teeth 18 formed on the end of the shaft 8 or an even multiple thereof. The gear 6 is positioned on the shaft 8 and the detent wheel 22 is positioned on the shaft 21 so that when the detent 28 engages between adjacent teeth 7 of the gear 6 and the detent roller 26 engages the surface between two of the flutes 27 of the detent wheel 22, the teeth 18 are aligned with the spaces between the teeth 19 and the two sets of teeth are in meshing relationship.

It is apparent then, that when the system is stationary; that is, when neither of the shafts 8 or 21 are rotating, the shaft 8 may be translated along the shaft 11 by means of electromagnets 13 and 14 and meshing of the gears 18 and 19 is assured. The tooth 4 must be of sufficient length along an axis parallel to the shaft 3 to engage the teeth 7 of the gear 6 regardless of the position of the shaft 8 on the shaft 11 and further, in a simple embodiment of the present invention, the detent 28 must be able to move with the gear 6 so as to maintain the detenting action. In order to accomplish this latter result, the detent wheel 28 is mounted on a shaft 29 which is slidably carried by a link 31.

Normally, the electromagnet 13 is energized so that the shaft 8 is in its forwardmost position relative to the tooth 4 and the teeth 18 are out of engagement with the teeth 19. The gear 6 can now be rotated intermittently by the action of the shaft 3 and tooth 4 without imparting any motion to the shaft 21 and, therefore, the sprocket 23. When it is wished to produce rotation of the sprocket 23, the electromagnet 13 is de-energized and the magnet 14 is energized so that the shaft 8 is moved rearwardly toward the shaft 21 and the teeth 18 are brought into meshing relationship with the teeth 19. Thereafter, intermittent rotary motion imparted to the gear 6 is also imparted to the shaft 21 and to the sprocket 23 to produce a feeding movement of the tape engaged by the sprocket.

Proceeding now to a description of the driving relationship existing between the tooth 4 and the gear 6, reference is made specifically to the various illustrations of FIGURE 2 of the accompanying drawings. Referring initially to FIGURE 2A, the shaft 3 and tooth 4 rotate clockwise about the axis of the shaft 3 while the gear wheel 6 is to be rotated counterclockwise about the axis of the shaft 11. The center or the axis of the shaft 3 is positioned as close as possible to the apex of the sides of one of the teeth 7 and since the angles of the tooth 4 and the teeth 7 are both 60°, the tooth 4 initially engages the left side, as illustrated in FIGURE 2A, of the tooth 7 when the tooth 4 lies along the line 32 which is disposed at an angle of approximately 30° with respect to the left side of the tooth 7. Continued rotation of the tooth 4 produces rotation of the gear 6 and after 60° of rotation of the tooth 4 the various members obtain the position illustrated in FIGURE 2B of the accompanying drawings. At this time, one-half of the feed interval has been completed and the central axis of the tooth 4 lies along a radius of the gear 6 passing through the intersection between adjacent sides of two of the teeth 7. The tooth 4 continues to drive the gear 6 for a short distance past the position illustrated in FIGURE 2B so that a positive drive is provided for the gear 6 through somewhat more than half of the angular movement to be imparted to the gear.

The operation of the apparatus thereafter is determined by the speed and mass of the driven elements and more particularly upon the momentum imparted to the apparatus. If the momentum of the apparatus is insufficient to overcome the friction forces of the system, once the tooth stops positively driving the gear 6, the gear would stop movement almost immediately and a feed cycle would not be completed. However, since the gear 6 is driven more than half way through its feed rotation by the tooth 4, the detent 28 engages the trailing edge of an adjacent tooth 7 and the detent 26 engages wheel 27 and due to their detenting action, produce continued rotation of the gear 6 until the detent wheels 26 and 28 again engage adjacent surfaces of two of the teeth on their associated wheels. Therefore, in such a case, the tooth 4 produces only slightly more than one-half the required rotation of the gear 6 and the detents 26 and 28 produce the remainder of the rotation required to complete a feeding cycle. It is apparent, of course, and reference is now made to FIGURE 2D, that at the end of a feeding cycle, the axis of the shaft 3 must again be disposed at the apex of the outer edges of the teeth 7 and, more specifically, of the tooth 7 which is adjacent the tooth just previously engaged by the member 4.

If the momentum of the rotatable apparatus is such that it overcomes the friction forces of the apparatus, then the gear 6, due to its tendency to continue rotation, engages the trailing edge of the tooth 4 and controlled deceleration is imparted to the rotating apparatus. More specifically, and reference is now made to FIGURE 2C of the accompanying drawings, if the rotating apparatus continues to rotate, due to its own momentum after driving motion is no longer imparted thereto by the tooth 4, the leading edge of the tooth 7 following the tooth just previously engaged by the tooth 4, contacts the trailing edge of the tooth 4 and further movement of the driving mechanism is prevented. The engagement between the teeth 4 and 7 coupled with the action of the detent wheels 26 and 28 is completely sufficient to prevent overshoot of the apparatus even when driven at exceedingly high speeds.

Referring again to FIGURE 2C, it is seen that rotation of the gear 6 is terminated in the position illustrated in this figure and at such time the center axis of the tooth 4 is lying at an angle of 30° with respect to the adjacent surface of the tooth 7 and this, taken in conjunction with the fact that the tooth 4 initially engages the tooth 7 at an angle of 30° with respect to the trailing edge of the tooth, as illustrated in FIGURE 2A, makes it apparent that an entire driving cycle requires only 120° of rotation of the shaft 3. In consequence, the interval required for the shaft 3 to rotate through the remaining 240° of its circle of rotation, is available to control the energization of the electromagnets 13 and 14 and therefore to determine whether a feed cycle is to be undertaken. Synchronization of the operation of magnets 13 and 14 with the interval of rotation of the shaft 3 during which the tooth 4 is not in driving relationship with the gear 6 may be accomplished by any number of well known means such as the utilization of a variable reluctance pick-up sensing the position of a metallic disc carried on the shaft 3 or other shaft or a rotatable member synchronized with the rotation of the shaft, 3.

Returning now to the drawings of FIGURE 2, the design of the apparatus may be such that no sliding movement occurs between the tooth 4 and the teeth 7 of the gear 6. Specifically, since the teeth 4 and 7 are rotating in opposite directions about their respective shafts, appropriate contouring of the teeth to have teardrop shapes permits a rolling contact to be established between these two members and wear on the driven element is minimized, thereby providing an apparatus having extremely long life even when operated at exceedingly high speeds. Further, since the apparatus is capable of trouble-free operation at both quite low and quite high speeds, the mechanism is highly flexible with regard to its fields of applicability. In addition, for specific applications, the teeth contours may be modified so as to provide a variety of acceleration curves if a small degree of slippage is permissible.

Referring now specifically to FIGURE 3 of the accompanying drawings, there is illustrated an embodiment of the invention in which two teardrop-shaped gear teeth are provided on the end of the shaft 3. The teeth, which are designated by the reference numerals 4 and 4*a*, are illustrated as diametrically opposed to one another and as having a shape as illustrated in FIGURES 2*a* through 2*d* of the accompanying drawings. When such a mechanism is employed, the specific mode of operation is identical with the apparatus illustrated in FIGURE 1; but two driving intervals are provided for each rotation of the shaft 3. Obviously, additional teeth may be provided; but this materially reduces the ratio of quiescent to active time.

Referring now specifically to FIGURE 4 of the accompanying drawings, there is illustrated as perspective view of an apparatus of the present invention which may be employed to advance large sections or blocks of a tape during each cycle of rotation. The only difference between the apparatus illustrated in FIGURES 1 and 4 is that, in FIGURE 4, a step-up gear arrangement has been provided so that the drive sprocket is rotated through a relatively large angle during each interval of rotation of the gear wheel associated with the single gear tooth. A toothed gear 36 is driven by a toothed belt 37 for imparting a continuous counterclockwise rotation, at a desired speed, to a shaft 38 on which the tooth gear 36 is mounted. Located on the rear of the gear shaft 38, as illustrated in FIGURE 4, is a driving member or tooth 39 having a generally teardrop shape as illustrated by teardrop 4 in FIGURE 2*a–d* of the accompanying drawings. The tooth 39 is in driving relationship with a gear wheel 41, which is substantially identical with the gear wheel 6 of FIGURE 1, having a plurality of teeth 42 formed about the periphery thereof. The gear wheel 41 is secured to a cylindrical shaft 43 having a gear wheel 44 disposed on the opposite end thereof. The gear wheel 44 is in meshing relationship with a gear wheel 46 which is quite small in diameter relative to the wheel 44. The gear wheel 46 is secured to a shaft 47, having a cylindrical spline 52 adapted to rotate therewith. The spline 52 extends through a toothed aperture 53 in a hollow cylindrical clutch member 48 so that the spline 52 and clutch member 48 remain in driving relationship to one another while the clutch member 48 slides longitudinally along the shaft 47.

The sliding movement of the clutch member 48 is under control of an armature 54 of a pair of electromagnets 56 and 57, the armature terminating in a fork 58 having fingers 59 and 61 which are disposed in a groove 60 of the clutch member 48. The armature 54 is pivoted as at 62 and, upon being attracted to one or the other of the electromagnets 56 or 57, imparts translatory movement to the clutch member 48, causing it to slide axially of the shaft 47. The clutch member 48 terminates at its rearward end, as illustrated in FIGURE 4, in a plurality of teeth 63 which are adapted to mesh with a second plurality of teeth 64 formed on the transverse end of a second hollow cylindrical clutch member 66. The clutch member 66 is rotatably supported on the shaft 47 but is prevented from sliding with respect to the longitudinal axis of the shaft.

The clutch member 66 has secured thereto a detent wheel 67 and a drive sprocket 68 adapted to engage the medium to be transported. The detent wheel 67 is engaged by a detent roller 69 which is suitably spring biased into engagement with the periphery of the wheel 67. The gear wheel 41 is provided with a detent roller 71 which is suitably spring biased into engagement with the periphery of the wheel. The detent mechanisms, comprising the wheels 67 and 69 on one hand and the wheels 41 and 71 on the other, are arranged such that when the apparatus is stationary; that is, between feed cycles, the teeth 63 of the clutch member 48 are aligned in meshing relationship with the teeth 64 of the clutch member 66.

The operation of the apparatus illustrated in FIGURE 4 is identical with that illustrated in FIGURE 1. The only difference between the two mechanisms lies in the provision of the gear wheel 44 and its associated gear 46 which are employed to impart a large angle of rotation to the sprocket 68 in response to a relatively small angle of rotation of the gear wheel 41. The gear ratio between the members 44 and 46 may be adjusted so that any reasonable number of lines of the tape may be advanced for each cycle of operation of the apparatus.

As previously indicated, the drive mechanism may be employed as an escapement mechanism since the gear wheel is rotated at precisely defined intervals during each operating period. In such a case, the clutch mechanism may be eliminated and the drive sprocket may be replaced by other motion transmitting means.

While I have described and illustrated specific embodiments of my invention, it will be clear that variations of the details of construction which are specifically illustrated and described may be resorted to without departing from the true spirit and scope of the invention as defined in the appended claims.

What I claim is:

1. A mechanism for transporting a flexible member, comprising a first shaft having an end surface, means secured to said first shaft for engaging said flexible member, a second shaft axially aligned with said first shaft, said second shaft having an end surface juxtaposed to said end surface of said first shaft, each of said end surfaces having a plurality of substantially identical teeth disposed thereon, means for maintaining said teeth on said first shaft axially aligned in meshing relationship with said teeth on said second shaft when said shafts are at rest, means for selectively shifting said second shaft axially relative to said first shaft so as to produce selective engagement and disengagement of said teeth, and means for intermittently rotating said second shaft during regularly spaced time intervals.

2. A mechanism for transporting a flexible member, comprising a first shaft having an end surface, means secured to said first shaft for engaging said flexible member, a second shaft axially aligned with said first shaft, said second shaft having an end surface juxtaposed to said end surface of said first shaft, each of said end surfaces having a plurality of substantially identical teeth disposed thereon, detent means associated with each of said shafts for maintaining said teeth on said first shaft axially aligned in meshing relationship with said teeth on said second shaft when said shafts are at rest, electromagnetic means for selectively shifting said second shaft axially relative to said first shaft so as to produce selective engagement and disengagement of said teeth and means for intermittently rotating said second shaft during regularly spaced time intervals.

3. A mechanism for transporting a flexible member, comprising a first shaft having an end surface, means secured to said first shaft for engaging said flexible member, a second shaft axially aligned with said first shaft, said second shaft having an end surface juxtaposed to said end surface of said first shaft, each of said end surfaces having a plurality of substantially identical teeth disposed thereon, means for maintaining said teeth on said first shaft axially aligned in meshing relationship with said teeth on said second shaft when said shafts are at rest, means for intermittently rotating said second shaft during regularly spaced time intervals, means for selectively shifting said second shaft axially relative to said first shaft so as to produce selective engagement and disengagement of said teeth, said means for selectively shifting being energized at times between said regularly spaced time intervals only.

4. A mechanism for transporting a flexible member, comprising a first shaft having an end surface, means secured to said first shaft for engaging said flexible member, a second shaft axially aligned with said first shaft, said second shaft having an end surface juxtaposed to said end surface of said first shaft, each of said end surfaces having a plurality of substantially identical teeth disposed thereon, means for maintaining said teeth on said first shaft axially aligned in meshing relationship with said teeth on said second shaft when said shafts are at rest, means for selectively shifting said second shaft axially relative to said first shaft so as to produce selective engagement and disengagement of said teeth, a gear, means for imparting rotation of said gear to said second shaft, said gear having a plurality of teeth, a rotatable shaft, at least one gear tooth secured to said shaft and terminating at the center thereof, the axis of said third shaft being displaced from the axis of said gear by a distance substantially equal to the radius of said gear to the outer extremities of said gear teeth, said at least one gear tooth having a radial length substantially equal to the radial length of said gear teeth and means for continuously rotating said third shaft.

5. The combination according to claim 4 wherein the angle of said gear teeth and the angle of said gear tooth are equal to approximately 60° so as to impart rotation to said second shaft during 120° of each cycle of rotation of said third shaft.

6. The combination according to claim 4 wherein said at least one gear tooth has a generally teardrop shape and the shape of said gear teeth are such that a rolling contact is maintained between said at least one gear tooth and said gear teeth.

7. A mechanism for transporting a flexible member, comprising a first shaft having an end surface, means secured to said first shaft for engaging said flexible member, a second shaft axially aligned with said first shaft, said second shaft having an end surface juxtaposed to said end surface of said first shaft, each of said end surfaces having a plurality of substantially identical teeth disposed thereon, means for maintaining said teeth on said first shaft axially aligned in meshing relationship with said teeth on said second shaft when said shafts are at rest, at least one electromagnet, a shifting arm engaging said second shaft for axially shifting said second shaft relative to said first shaft so as to produce selective engagement and disengagement of said teeth, means for connecting said shifting arm to said armature so as to shift said teeth of said second shaft into engagement with said teeth of said first shaft upon energization of said electromagnet, and means for intermittently rotating said second shaft during regularly spaced time intervals during de-energization of said electromagnet.

8. The combination according to claim 7 further comprising a second electromagnet for positioning said armature, said armature moving said shifting arm so as to produce disengagement of said teeth when attracted to said second electromagnet.

9. A mechanism for transporting a flexible member, comprising a first shaft having an end surface, means for imparting rotation to said flexible member secured to said first shaft and engaging said flexible member, a second shaft axially aligned with said first shaft, said second shaft having an end surface juxtaposed to said end surface of said first shaft, each of said end surfaces having a plurality of substantially identical teeth disposed theron, a gear having a plurality of teeth, means for transporting rotation of said gear to said second shaft, a third shaft having at least one tooth for engaging said teeth of said gear, means for continuously rotating said third shaft, a first detent roller resiliently biased into engagement with said gear teeth of said gear, a detent wheel secured to said first shaft and having a plurality of teeth formed about a peripheral surface thereof, a second detent roller resiliently biased into engagement with said teeth of said detent wheel, said teeth on said gear and said detent wheel being positioned relative to said teeth on said end surfaces of said first and said second shafts such that said latter teeth are maintained in axial meshing alignment during stationary intervals of said shafts, and means for selectively shifting said second shaft axially, relative to said first shaft, so as to produce selective engagement and disengagement of said teeth.

10. The combination according to claim 9 wherein the axis of said third shaft is parallel to the axis of said second shaft, said gear tooth being secured to the end of said third shaft terminating at the center thereof, the axis of said third shaft being displaced from the axis of said second shaft by a distance substantially equal to the radius of said gear to the outer extremities of said gear teeth, and said single gear tooth having a radial length substantially equal to the radial length of said gear teeth.

11. The combination according to claim 10 wherein said gear tooth has a generally teardrop shape and wherein the shape of the vertex of the surface defined by two adjacent gear teeth of said gear conforms to the shape of surface of the part of the single gear tooth engaged thereby.

12. The combination according to claim 11 wherein said means constitutes a gearing mechanism for producing a larger rotation of said second shaft than of said gear.

13. The combination according to claim 11 wherein said means for imparting rotation constitutes securing said gear to said second shaft.

14. In combination, a first shaft having a gear secured thereto, a second shaft parallel to said first shaft, the axes of said shafts being displaced by a distance equal to the radius of said gear to its outer extremity, at least one gear tooth secured to said second shaft and disposed in meshing engagement with said gear, said gear tooth terminating at the center of said second shaft and having a radial length substantially equal to the radial length of the teeth of said gear and means for rotating said second shaft about its axis.

15. The combination according to claim 14 wherein said gear tooth is of a generally teardrop shape and the teeth of said gear have a generally negative teardrop shape.

16. A mechanism for imparting intermittent motion to a member comprising a first shaft having a plurality of teeth extending axially from a surface thereof, means secured to said first shaft for engaging said member in driving relationship, a second shaft having a plurality of teeth extending axially from a surface thereof, said shafts being coaxial, means for maintaining said teeth on said shafts in meshing alignment with one another, means for selectively shifting said second shaft axially so as to produce selective engagement and disengagement of said teeth of said shafts, and means for intermittently and cyclically rotating said second shaft.

17. The combination according to claim 16 wherein said means for intermittently and cyclically rotating said second shaft comprises a gear secured to and symmetrical with respect to the axis of said second shaft, a third shaft parallel to said second shaft, the axes of said second and third shafts being displaced by a distance substantially equal to the radius of said gear to its outer extremity, at least one gear tooth secured to said third shaft and disposed in meshing engagement with said gear, said gear tooth terminating at the center of said third shaft and having a radial length substantially equal to the radial length of the teeth of said gear and means for rotating said third shaft about its center.

18. The combination according to claim 17 wherein said gear tooth is of a generally teardrop shape and the teeth of said gear have a negative teardrop shape.

19. A mechanism for imparting intermittent motion to a member comprising a first shaft having an end surface, means secured to said first shaft for engaging said member, a second shaft axially aligned with said first shaft, said second shaft having an end surface juxtaposed to said end surface of said first shaft, each of said end surfaces having a plurality of substantially identical teeth disposed thereon, means associated with each of said shafts for maintaining said teeth on said first shaft axially aligned in meshing relationship with said teeth on said second shaft when said shafts are at rest, electromagnetic means for selectively shifting said second shaft axially relative to said first shaft so as to produce selective engagement and disengagement of said teeth, and means for intermittently rotating said second shaft during regularly spaced time intervals.

20. The combination according to claim 19 wherein the angles of said gear teeth and the angle of said gear tooth are approximately the same.

21. The combination according to claim 20 wherein said angle is 60°.

References Cited in the file of this patent

UNITED STATES PATENTS

| | | |
|---|---|---|
| 1,967,505 | Hansen | July 24, 1934 |
| 2,009,847 | Kelley | July 30, 1935 |
| 2,405,171 | Wildhaber | Aug. 6, 1946 |
| 2,816,459 | Badlam | Dec. 17, 1957 |
| 2,869,700 | Bowden | Jan. 20, 1959 |